3,514,680
RETROTORQUE BRAKING FOR STEP SERVOMOTORS
Richard R. Williams, Los Angeles, Calif., assignor to IMC Magnetics Corporation, a corporation of California
Filed Nov. 23, 1966, Ser. No. 596,642
Int. Cl. H02p 1/00, 3/00
U.S. Cl. 318—138                              10 Claims

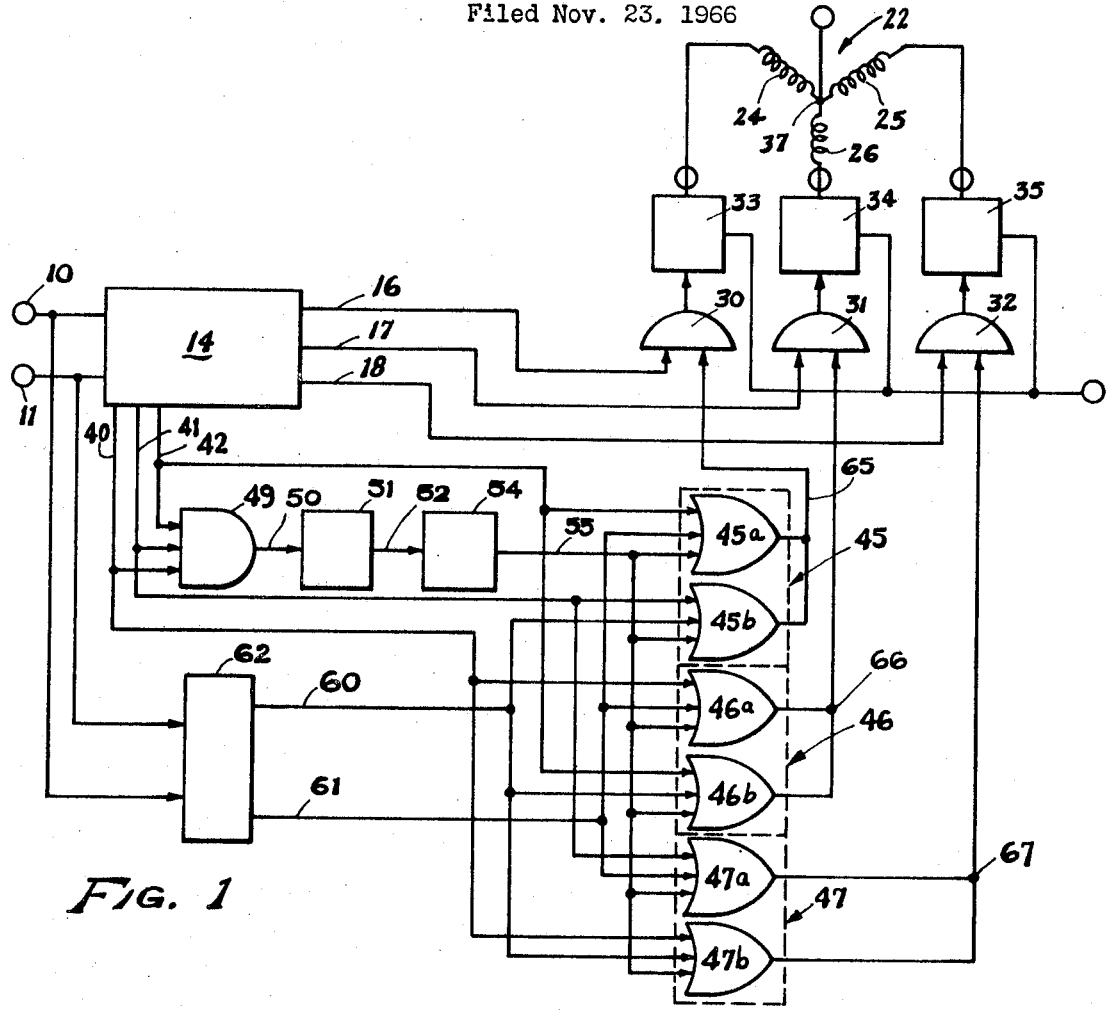
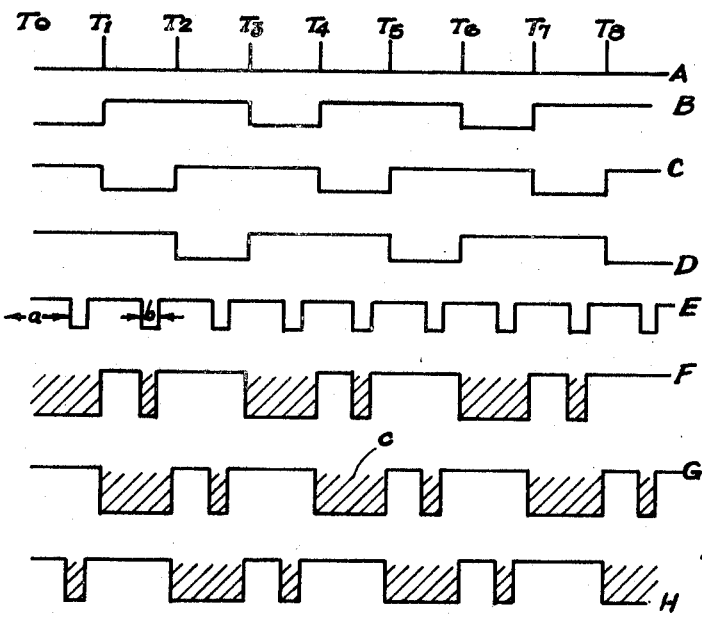
Fig. 1
Fig. 2
INVENTOR.
RICHARD R. WILLIAMS
BY
Herzig, Walsh & Blackham
ATTORNEYS či# United States Patent Office 3,514,680
Patented May 26, 1970

ABSTRACT OF THE DISCLOSURE

The invention is an improvement in controllers for step servomotors. Plural windings are energized in sequence either for clockwise (CW) or counterclockwise (CCW) rotation. Upon delivery of each energizing pulse to a motor winding an inverse pulse is generated. A single delay means is provided to impart a predetermined delay to the inverse pulse which is then applied by way of selective control circuitry, and dependent upon the direction of rotation to the winding that was energized preceding the currently energized winding to apply a retrotorque thereby preventing hunting and oscillation of the motor. Single components are utilized for providing the delay and its duration to create the retropulse which is controllably applied as stated to the correct winding and depending upon the direction of rotation.

---

This invention relates to the control of step servomotors. Such motors are ordinarily controlled by a control circuit, which may be a ring counter circuit in order to operate the servomotor in steps in either direction. In applications of such motors requiring fast response, there is a tendency for the motor to overshoot and oscillate as the motor moves to each new position, due to the inertia of the rotor and load. This invention relates to a braking system for such step servomotors having the capability of operating to overcome the tendency of the motor to overshoot and oscillate, as described. Thus, the system is effective to improve the response time of the step servomotor. The realization of these ends constitute a primary object of the invention.

In a preferred form of the invention, it takes the form of a retrotorque braking system wherein the braking action is produced by creating electrically, a retrotorque as the rotor moves to each new position to overcome the tendency to overshoot and oscillate.

The normal manner of excitation of a step servomotor is by applying a DC voltage to one winding at a time in a sequential manner. The motor may be driven by a step controller which may be a ring counter and an exemplary form of such a step controller is the one in the patent of Ronald A. Cunningham, Pat. No. 3,254,286.

The herein invention provides means whereby while the motor is in motion, and at a predetermined time before it reaches its new position when stepping, a pulse of predetermined duration is introduced into the winding that was previously excited to produce a negative or retro-torque. This retrotorque constitutes a braking action which eliminates or minimizes any possible overshoot and oscillation. It is a further object of the invention to provide simplified and effective means for creating the retrotorque braking action.

Normally the controller for a step motor is driven from a source of pulses which provide for driving the motor either in a clockwise, (i.e.) CW direction, or a counterclockwise, (i.e.) CCW direction. In a preferred form of this inventon, means are provided to correctly select the winding to which the retro or braking pulse is applied, (i.e.) the winding preceding the winding which is currently energized by a pulse for rotating the motor. Means are provided so that output pulses for applying retrotorque are produced, corresponding to each of the successive driving pulses being supplied to the motor windings. These pulses are the inverse of the driving pulses. These pulses are supplied to a series of components which produce the delayed retro-pulse of the proper width and delay, which is in turn fed to the selective means which selects which winding the retropulse is to be fed to. Means are also provided which are responsive to the direction of rotation whether clockwise or counterclockwise, producing an output directed to the selective means to inform this means of the direction of rotation. This means which as stated, takes the form of a group of AND gates, therefore is supplied with information by way of incoming signals as to which winding is being supplied with a driving pulse; the direction of rotation; and a retropulse incorporating predetermined delay and width. The selector means, that is the group of AND gates is interconnected so that coincidence can occur only at a single gate so that the retropulse can be passed only by this gate to the proper winding in relation to the winding which is currently energized for driving the motor. In this way the primary object of the invention is realized.

It is a further object of the invention to provide means as described embodying the selective AND gates, for producing the desired shaped retropulse and supplying it selectively to the correct motor winding which is related to the currently energized winding by way of position or proximity, and direction of rotation.

Further objects and additional advantages of the invention will become apparent from the following detailed description and annexed drawings wherein:

FIG. 1 is a circuit diagram of a preferred form of the controller or retrotorque braking system of the invention.

FIG. 2 is a wave form timing diagram illustrating typical voltage wave forms generated in the retrotorque controller.

Referring to FIG. 1 of the drawings, numeral 10 designates a terminal which is connected to a pulse source which generates a pulse train for clockwise (i.e.) CW operation of the stepper motor. Numeral 11 designates a terminal connected to a pulse source or input for counterclockwise (i.e.) CCW operation of the stepper motor. Terminals 10 and 11 connecting to the pulse source connect to a step motor controller or ring counter designates by the numeral 14 which may be of the type shown in the patent referred to above. This controller has three primary outputs 16, 17, and 18, which are the primary signals required for excitation of the step motor by exciting its windings sequentially to produce rotation in either one direction or the other. The component 14 constitutes bi-directional control logic for the stepper motor. As indicated in the foregoing, the control logic may be a ring counter or a gated multi-vibrator counter.

Numeral 22 designates diagramatically the stepper motor. This motor may be of a conventional type and as shown, it is one having three windings 24, 25, and 26, which are adapted to be sequentially energized for rotation in either one direction or the other.

The primary outputs 16, 17 and 18 are connected to the OR gates 30, 31, and 32, which control the sequencing of outputs switches 33, 34, and 35 as will be described presently. The output switches 33, 34, and 35 individually control the respective windings 24, 25, and 26. The primary outputs 16, 17, and 18 cause the output switches 33, 34, and 35 to conduct one at a time in a sequential order in one direction or the other, as will be described. When any output switch is conducting, a current flows through its respective motor winding 24, 25, or 26 of the three phase motor 22, the windings all connecting to a common terminal 37. As will be understood, the operation of switching the current from winding to winding sequentially, as controlled by the controller 14, produces the motor rotation either clockwise or counterclockwise. The gates 30, 31, and 32 may be conventional components comprising integrated solid state circuits or otherwise.

Numerals 40, 41, and 42 designate secondary outputs from the controller or control logic 14. These outputs are applied to an OR gate 49 as shown and also the AND gates 45, 46, and 47. The outputs 40, 41, and 42 are inverted signals of the outputs 16, 17, and 18. The inputs to OR gate 49 are capacitor coupled preferably, so that only the change in voltage is seen in the output 50 of OR gate 10. Output 50 is a voltage pulse occurring at the same time as the excitation or voltage pulse to each winding of the motor 22. This pulse is applied to mono-stable multivibrator 51. This multivibrator produces an output pulse at 52 which is variable from zero to 5 milliseconds in width. This zero to 5 milliseconds width pulse controls the time delay for the retropulse applied for the braking action. Pulse 52 is applied to a second mono-stable multivibrator 54. This multivibrator produces an output pulse 55 delayed by the time delay of the delay pulse 52 and with a duration that is variable from zero to 4 milliseconds in width. Pulse 55 is applied to AND gates 45, 46, and 47. Also present at the inputs to AND gates 45, 46, and 47 are the outputs 60 and 61 of bistable multivibrator 62. Multivibrator 62 is of the set, reset type and provides direction sensing. The output state of multivibrator 62 is determined by the presence of a pulse train on the inputs 10 or 11 which are connected to multivibrator 62. The output is a steady state voltage.

The AND gates 45, 46, and 47 are dual gates connecting respectively, through gates 30, 31, and 32, and switches 33, 34, and 35 to windings 24, 25, and 26. The dual gates are designated at 45a, 45b, 46a, 46b, and 47a, 47b. One of each of the dual gates is for CW operation and one for CCW operation, output 61 connecting to gates 45a, 46a, and 47a, and output 60 connecting to gates 45b, 46b, and 47b.

Output 55 connects to all of the dual gates.

Output 40 connects to gates 46a and 47b. Output 41 connects to gates 45b and 47a. Output 42 connects to gates 45a and 46b. Considering these connections, it will be observed, and as will be made clear presently, that when a rotative pulse is applied to any winding, a retropulse can be applied to the previously excited winding, whether the rotation is CW or CCW. For example, if a CW pulse is applied to winding 24 from output 16, the retropulse will be supplied to winding 26 from output 40 by way of dual gate 46a.

Multivibrators 51, 54, and 62 may comprise conventional, known circuitry, or may comprise integrated solid state circuitry. The same is true of the various AND, and OR gates.

All the necessary control information is now available at the inputs of the AND gates 45, 46, and 47 to steer the retropulse to the appropriate motor winding. The gate 45 is connected to the OR gate 30; the gate 46 is connected to the OR gate 31; and the gate 47 is connected to the OR gate 32. The retropulse is to be directed to the winding which was excited during the previous time period, as will be described below. Inputs 40, 41, and 42 reveal which motor winding is presently excited. Input 55 determines the delay and duration of the retropulse. Inputs 60 and 61 tell which direction the motor is turning (i.e.) which winding will be excited next. AND gates 45, 46, and 47 are dual three input AND gates with outputs 65, 66, and 67. One section of each AND gate is for clockwise operation and the other section is for counterclockwise operation. Coincidence will occur in only one section of one AND gate at a time, gating the retropulse to OR gates 30, 31, and 32. The retropulse will also cause an output switch to conduct and a current will flow in a motor winding for a duration determined by multivibrator 54 and delayed by the time determined by multivibrator 51. With this method of gating the retropulse will occur in only the winding which was excited during the previous time period, regardless of which direction is commanded. Another advantage to this method of gating is that only one delay multivibrator 51, and one duration multivibrator 54 is required to produce the retropulse for all three motor windings. This makes possible only two adjustments to provide the time for both delay and duration of the retropulse for all three motor windings.

The following is an example of the operation. Pulses are supplied to terminal 10 for CW operation. A pulse appears on output 16. This gates the gate 30 to operate switch 33 to apply a pulse to winding 24 for CW angular rotation. An inverse pulse appears on output 40 which produces a pulse at output 55, characterized by a delay and width as described above. This pulse is applied to all of gates 45a, b; 46a, b; and 47a, b. The output pulse 40 is applied to gates 46a, and 47b. Output 61 of multivibrator 62 is now energized from terminal 10 and its signal is applied to gates 45a, 46a, and 47a. Coincidence now occurs at gate 46a and a retropulse is supplied to gate 31 actuating switch 34 to apply the retropulse to winding 26, the one previously excited in the CW rotation.

FIG. 2 is a waveform timing diagram illustrating typical voltage waveforms encountered in the controller. Waveforms for clockwise pulse train input 10 are represented. Waveforms B, C, and D show the basic count by three, function of the control logic. That is, they show the pulses applied to successive windings in successive time periods, $T_0$, $T_1$, $T_2$, etc. Waveform E is the delayed retropulse; $a$ represents the time delay determined by multivibrator 51 and $b$ being the pulse duration determined by multivibrator 54. Waveforms F, G, and H illustrate voltage present at the windings of a three phase variable reluctance step motor, such as shown at 22 with the retropulses introduced. The shaded areas $c$ indicate the times when current is flowing in the motor windings. It can be noted here that, during any time current flows in one winding for the complete period and also for the duration of the retropulse in the winding that was conducting during the previous time period. It also should be noted that both time delay $a$ and pulse duration $b$ are variable so that the retropulse can be adjusted to provide the optimum retrotorque braking action for various load conditions of the step servomotor.

From the foregoing those skilled in the art will observe and understand the nature and operation of the invention and the manner in which its objects are realized.

The foregoing disclosure is representative of a preferred form of the invention and is to be interpreted in an illustrative rather than a limiting sense, the invention to be accorded the full scope of the claims appended hereto.

What is claimed is:

1. In a controller for a motor having a plurality of windings and adapted to be operated in discrete steps, either clockwise or counterclockwise, in combination, means for supplying energizing pulses to individual windings in sequence to drive the motor in steps from one position to another either clockwise or counter clockwise, means for producing a retropulse at a time when an energizing pulse is supplied to one of said windings and means for applying said retropulse to another winding for producing a retrotorque braking action to prevent overshoot at a time when the said motor is approaching said other position in response to an energizing pulse.

2. A combination as in claim 1 having means whereby the retrotorque pulse is applied to the winding preceding the currently energized winding.

3. A system as in claim 1 including means for delaying said retropulses with respect to the energizing pulses and predetermining the duration of said retropulses.

4. A system as in claim 1 including means for selecting the winding to which the retropulse is to be supplied, said last means being responsive to the direction of rotation of the motor and to a signal indicating which winding is being energized for rotation.

5. A combination as in claim 1 including means for producing, from said energizing pulses, reverse pulse signals which are the inverse of the energizing pulses, means for deriving the retropulses therefrom, and means for supplying said retropulses to the said windings in sequence, the retropulse being supplied to the winding preceding the one currently energized by a driving pulse.

6. A combination as in claim 5 wherein said means for producing said reverse pulse signals comprises means responsive to a pulse source and representative of the direction of rotation for producing a directional signal; and gating means responsive to said reverse pulse signals, said retropulses and said directional signal for applying a retropulse to a selected one of said windings positionally related to the currently energized winding.

7. A system as in claim 6 wherein said gating means comprises a plurality of AND gates having connections to the motor windings, means whereby the controlled retropulse is supplied to a group of said AND gates, means connecting said pulse signals to a group of said gates, and said means responsive to said directional signals having connection to a group of said gates and the inputs thereto being so arranged that coincidence can occur at only one gate at a time, whereby to apply a retropulse to an individual winding, which is a winding preceding the winding which is currently energized for driving rotation.

8. A combination as in claim 1 including OR gates controlling the delivery of energizing pulses and braking pulses to individual windings.

9. A system as in claim 7 including OR gates associated with each winding for controlling the delivery of energizing pulses and braking pulses to the windings.

10. A combination as in claim 1 including means for producing pulse signals which are the inverse of the energizing pulses, means for deriving the retropulses therefrom and means for applying said retropulses to said windings in sequence.

References Cited
UNITED STATES PATENTS

| | | | |
|---|---|---|---|
| 3,328,658 | 7/1964 | Thompson | 310—138 |
| 3,324,369 | 6/1967 | Markakis | 318—138 |
| 3,345,547 | 10/1967 | Dunne | 318—138 |

G. R. SIMMONS, Primary Examiner

U.S. Cl. X.R.

318—254